(12) United States Patent  
McWhorter

(10) Patent No.: US 8,071,041 B2  
(45) Date of Patent: Dec. 6, 2011

(54) POTASSIUM ELECTRIC GENERATOR AND CHEMICAL SYNTHESIZER

(76) Inventor: Edward M. McWhorter, Citrus Heights, CA (US)

( * ) Notice: Subject to any disclaimer, the term of this patent is extended or adjusted under 35 U.S.C. 154(b) by 981 days.

(21) Appl. No.: 12/005,093

(22) Filed: Dec. 26, 2007

(65) Prior Publication Data

US 2009/0169925 A1    Jul. 2, 2009

(51) Int. Cl.
  *B01J 19/08*    (2006.01)
  *H01M 4/40*    (2006.01)
(52) U.S. Cl. .................... 422/186; 422/164; 429/102

(58) Field of Classification Search ................. 422/186, 422/186.04, 164; 429/102
See application file for complete search history.

(56) References Cited

U.S. PATENT DOCUMENTS 6,831,825 B1 * 12/2004 McWhorter ............... 361/321.6
* cited by examiner

*Primary Examiner* — Kishor Mayekar

(57) ABSTRACT

Alkaline metal fuel technology is applied to the design and construction of an electrolytic fuel cell. Highly exothermic chemical reactions and vigorous kinetic gaseous flows are promoted within a ferrous metal tubular structure called a tuyere which is used to generate electricity and to simultaneously produce nitrated products and commercial organic chemicals.

8 Claims, 5 Drawing Sheets

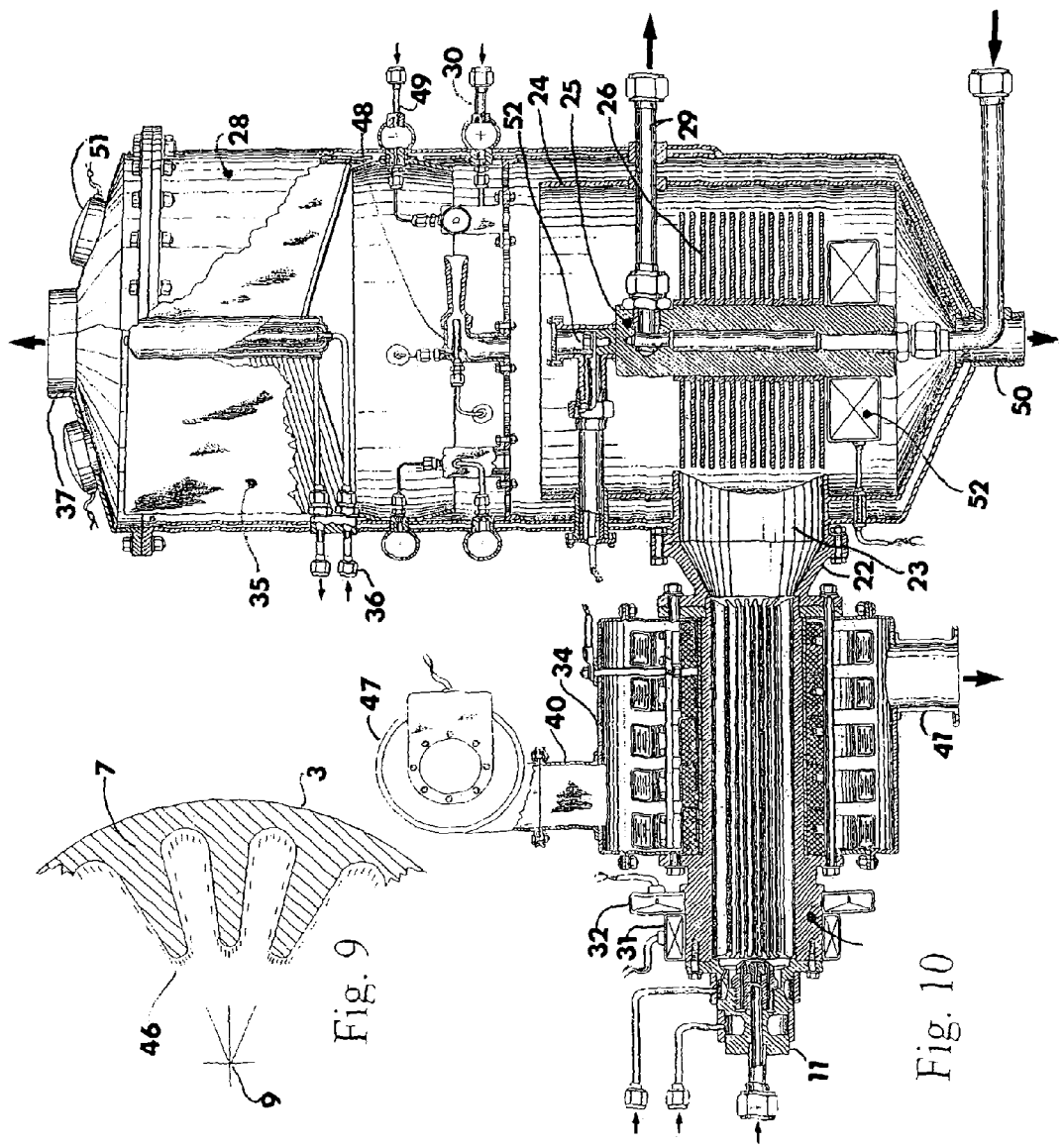

POTASSIUM ELECTRIC GENERATOR AND CHEMICAL SYNTHESIZER

CROSS REFERENCES

The alkaline, metals fuel technology referenced in the present invention relates to:
U.S. Pat. No. 6,831,825.

BACKGROUND OF THE INVENTION

The invention is a chemical reaction chamber used for the hydrolysis of alkaline metals. The said chemical reaction chamber is a ferrous metal tube, hereinafter referred to as the "tuyere". The highly exothermic reactions occurring during the hydrolysis reactions of potassium and sodium within the tuyere reaction chamber dissociates the water hydrogen-oxygen bonds and other organic hydrogen-carbon bonds of organic substances in the highly exothermic reactions within the tuyere producing a free radical ion stream and free electrons. The ions are used for chemical synthesis of commercial chemicals and the remaining recovered electrons are used in electrical generation.

The close confinement of the oxidation reactions occurring in the narrow tubular structure of the tuyere direct the kinetic force of the ionic stream along a single axis toward the electron absorbing finned collector surfaces of a cathode ionic capacitor described in U.S. Pat. No. 6,831,825.

Unlike atomic particle accelerators used in research studies of nuclear structure which accelerate low mass particles of electrons and positrons, or slightly heavier protons and antiprotons to near the speed of light by magnetic pulses within a strong electric field, the tuyere reactor chamber accelerates dissociated molecular ion fragments at a much slower sonic velocity along the longitudinal axis within the tuyere.

The potassium electric generator and synthesizer presented is not a research instrument as in the case of an accelerator but instead is more directly used for the commercial simultaneous electric generation and production of industrial chemical products. The potassium electric generator is employed as a low input electrical energy source for electric locomotives, large traction farm machinery, industrial equipment, marine propulsion, and public utility electrical grid supply and augmentation. The generator effluent produced during its operation is a value-added chemical by-product formulated within the synthesizer as marketable chemical substances.

Steam pressure and other gaseous products produced by the exothermic reactions within the tuyere reaction chamber expel ions severed by organic and inorganic chemical reactions injected within the tuyere and these attain sonic velocities through the reaction chamber charged thermal field and stream out of the tuyere at supersonic velocity to impact with the intervening cathode capacitor collecting surfaces positioned within a receiver cylinder of a gas scrubber.

The electrochemical equivalent energy expended in electrolysis to produce one gram of potassium metal, about 3.21545 ampere-hrs are required in the reduction of the alkaline metal. During the hydrolysis oxidation reaction of the alkaline metal in the tuyere to its original state, an electro-equivalent amount of electrical current is released into the ion stream. The electrochemical equivalence for producing one pound of potassium metal is 311 amp-hours. However when potassium metal is alloyed with sodium metal which requires 528 amp-hrs for 1 lb, a 50/50 mixture will produce a current flow of approximately 420 amp-hrs for each pound of fuel delivered to the tuyere reaction chamber.

Given mixtures of potassium and sodium at room temperature exists in the liquid state facilitating the use of precision metering pumps for the injection of small exact gram fractions of material into the tuyere reaction chamber in controlled simultaneous coordinated injection times and magnetic pulses. The metering pump is a precision positive displacement pumping system which in the present invention is used to control the low volume delivery of alkaline metal substances in exact metered pulses between high pressure reaction fluctuation within the tuyere. The quantity of electrons produced in the highly exothermic reduction reactions during each metered pulse is facilitated and kept moving within the ionic flow (Wakefield model) by the attraction and migration of ionic charges and electrons passing to the surface of the metal tuyere wall and subsequently passing in communication with, and held active, by electrical contact, into the tuyere dielectric capacitor circuit. This depletes the population remaining electrons in the ionic stream.

The vigorous oxidation reactions occurring within the tuyere place a strongly negative charge on the inner surfaces of the metal surface of the tuyere chamber. Electric charges on a conductor reside only on the surfaces. In order to increase the capacitance of the tuyere a plurality of longitudinally aligned fin protrusions, hereinafter termed "strakes", are positioned within the center volume of the tuyere reaction chamber to increase the surface area.

Electric charge density is greatest where the curvature of the surface is greatest. Therefore, charge density on the tuyere surface is greatest at the tip of the strakes as shown in FIG. 9 of the drawings presented in the Detailed Description of the Invention. The charge potential is strengthened and maintained by a plurality of dielectric capacitors formed as torus hoops positioned about the outside surfaces of the tuyere with one lead in electrical contact with the said outside surfaces of the tuyere and the other leading to a positive terminal lead.

The greatest charge density on the tips of the said tuyere strakes is also located in the area of highest kinetic shear of the ion stream flowing at sonic velocity within the tuyere. Electrons sheared from the stakes and magnetically directed in the ionic flow are carried in the slower moving reaction particle stream and enters the receiving chamber tangentially positioned inlet and circulates in a swirling action.

Above the scrubber receiving chamber is the scrubber spray equipment comprising a plurality of ejectors, cooling panels and ultra sonic transducers described more fully in U.S. Pat. No. 7,381,378. The purpose of the scrubber is to process $CO_2$ emissions and other carbonaceous material derived from the thermal dissociation of depolarizing elements present in the alkaline fuel mixture of from the trace amounts of this material remaining in the organic synthesis of sequestered coal flue gas emissions.

SUMMARY OF THE INVENTION

The invention is a method of hydrolysis of alkaline metals in a ferrous metal tubular reaction chamber termed a tuyere. The hydrolysis oxidation reactions are exothermic and vigorously kinetic, thereby providing the necessary conditions for an effective low input energy to produce an ionic stream that may be used for electrical generation by shearing electron charges from tuyere strake tips within the tuyere and transferred to the collecting surfaces of the anode ionic capacitors.

Another object of the invention is for the addition of reagent chemicals and catalysts to the scrubber effluent to form a variety of chemical substances with reactive open bonds of the ionic components formed in the tuyere and with $CO_2$ coal flue gas effluent.

BRIEF DESCRIPTION OF THE DRAWINGS

FIG. 9 is a small cross section of the tuyere illustrating the build-up of electrical charge at the point of greatest curvature at the tip of the strakes.

FIG. 10 is a drawing of the tuyere generator and scrubber assemblies shown in cross-section to illustrate how the system is operated in conjunction with other equipment.

DETAILED DESCRIPTION OF THE INVENTION

Figure 1:
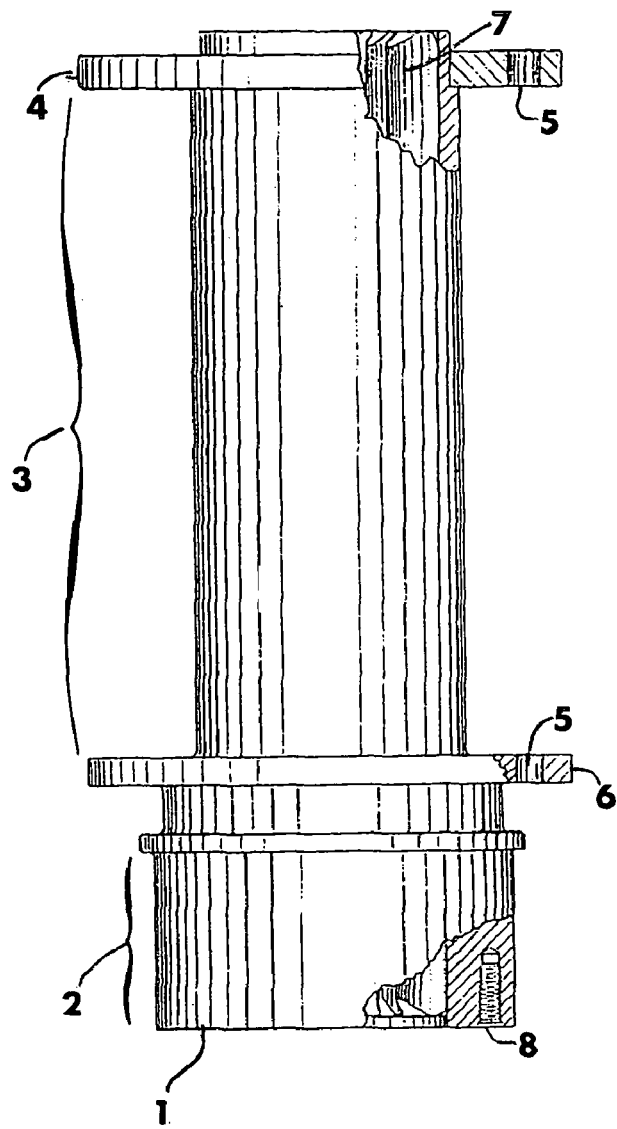
FIG. 1 is a side view of the tuyere machined tubular outer surfaces with two cross-section cutaways to show the method of bolting for attachment to an injector at the foreword end and to show the presence of a plurality of longitudinally aligned strakes on the inner surfaces of the tuyere reaction chamber.
Figure 2:
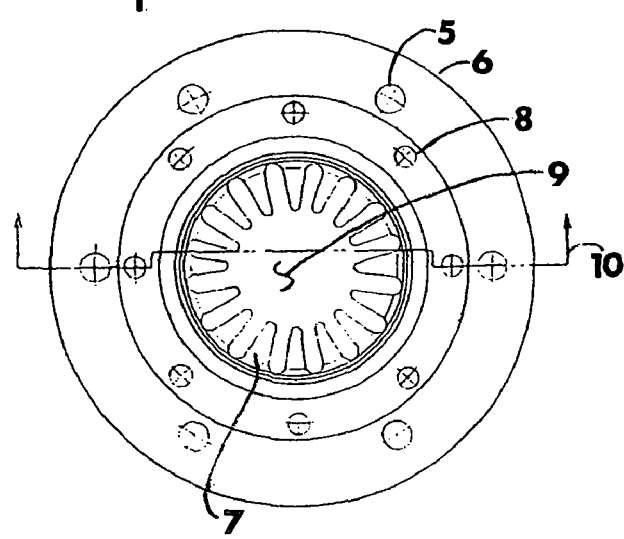
FIG. 2 is an end view of the tuyere, showing the inner bolt-hole circle for the mounting of the injector, and the outer bolt-hole circle for the passage of through bolts and these latter holes are also indicated in FIG. 1 cross-section assembly surface areas of magnet capacitor equipment and the internal positioning of sixteen strakes within the reaction area of the tuyere.

The tubular structure presented as FIG. 1 and FIG. 2 are the respective side view and frontal view of the chemical reaction vessel hereinafter called the tuyere 1. The purpose of tuyere 1 is to contain the highly vigorous kinetic and exothermic chemical reactions which occur in the reaction chamber 9 during the hydrolysis of alkaline metals and to convert these reaction energies into a useful electrical power source, and in conjunction with this function to, simultaneously promote the conditions of selected ionic chemical reactions for the synthesis and production of commercial chemicals. Referring to FIG. 1, the machined outer surfaces of tuyere 1 comprise a forward section 2 for mounting magnetic coils. The aft section 3 surfaces are for mounting dielectric capacitors which may be a single capacitor or a battery of capacitors. Immediately adjacent to aft section 3 is the aft mounting flange 4 which is detachable. The purpose of flange 4 is to provide a means of assembling the said dielectric capacitors over ceramic thermal insulators 33 shown in FIG. 8, extending over capacitor section 3 and holding them in place by long through-bolts 27 shown in FIG. 7 passing through six bolt holes 5 shown in FIG. 1.

Figure 8:
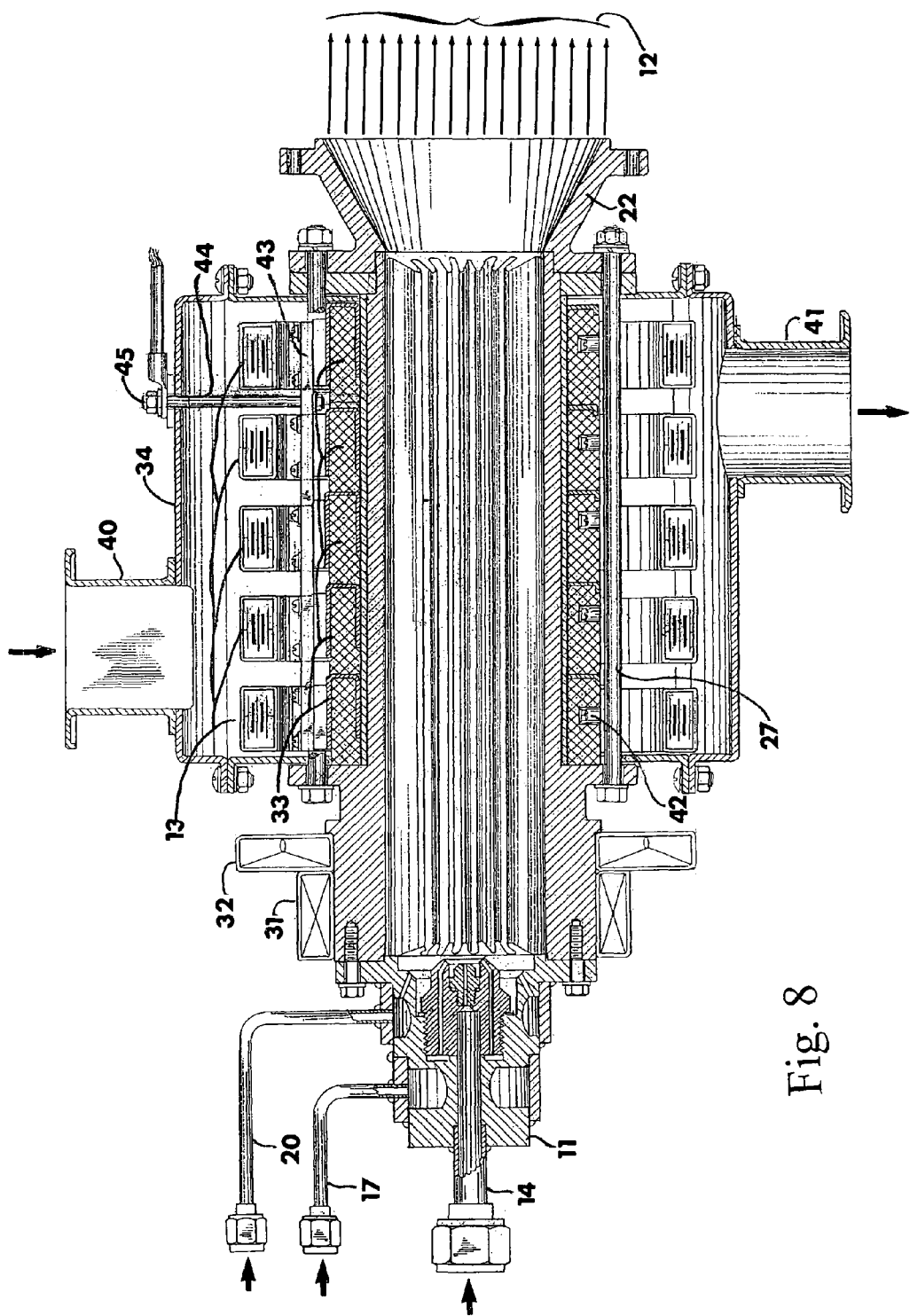
FIG. 8 is a cross section of the generator assembly showing the tuyere capacitor bank and ceramic thermal insulators and the magnetic coil section. This view contains the complement of all the elements claimed.

As shown in FIG. 8 the through bolts 27 extend across the length of capacitor section 3 surfaces to forward mounting flange 6 and pass through another set of six equally spaced bolt holes 5 as indicated in partial cutaway section of the said forward flange 6.

In FIG. 2 the partial cutaway sections at the forward and aft portions of the tuyere 1 show respectively the ribbed structure of two of the sixteen strakes which extend longitudinally the full length of tuyere 1 reaction chamber 9 and are equally spaced about the interior diameter of said reaction chamber 9 of the said tuyere 1. The tips of the strakes 7 extend centrally into the sonic ionic flow path and therefore the strake 7 tip surfaces should be smooth and regularly shaped in order to prevent the creation of shock waves from occurring in the ion stream. However, in some instances the regularity of the strake tip configuration may purposely be varied to increase the reaction rate of certain bonding reactions occurring within tuyere 1 ionic stream 12, shown in FIG. 8, instead of waiting for these reactions to occur downstream within the cathode ionic capacitor 25 in receiver vessel 24 as shown in FIG. 10. A cutaway exposing a partial section of tuyere 1 is shown in FIG. 1 and shows a threaded bolt hole 8 for mounting an injector. Eight of these bolt holes 8 equally spaced about the foreword face of tuyere 1 are shown in FIG. 2. Also shown in FIG. 2 are the forward ends of the sixteen strakes 7 that are positioned and equally spaced about the interior perimeters of tuyere 1 reaction chamber 9 and extend longitudinally the full length of tuyere 1 reaction chamber 9. Boundary line 10 of FIG. 2 delineates the areas of cross-sectioning of the assembly of injector 11, tuyere 1, and transition piece 22 that is shown in FIG. 8 and FIG. 10.

Figure 3:
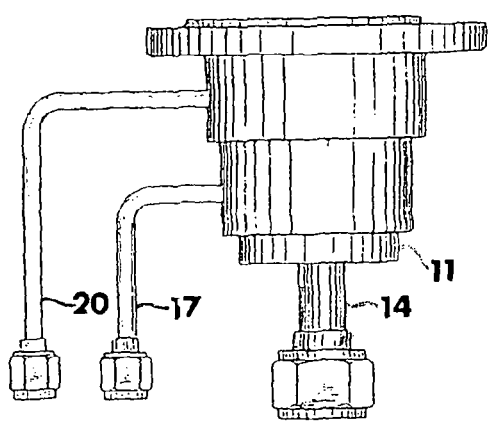
FIG. 3 is a side view of the tuyere injector.
Figure 4:
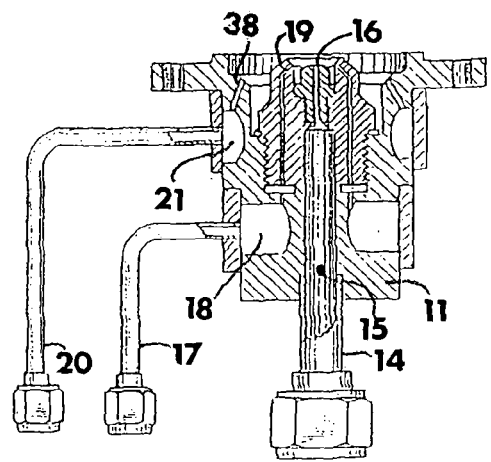
FIG. 4 is a side view of the tuyere injector presented principally in cross section showing the interior manifolding and flow passages of reactants to be injected into the reaction chamber of the tuyere.

Referring now to FIG. 3 which is a side-view of injector 11. The major components comprising injector 11 are shown in FIG. 4 presented principally in cross-section. Three reactant injector conduits, 14, 17 and 20 are in communication with three respective injector 11 reactant manifolds 15, 18 and 21. The said manifolds receive and distribute reactants through feed channels to three injector 11 orifices respectively numbered 16, 19 and 38. Reactants from said orifices 16, 19 and 38 are injected into combustion chamber 9 of tuyere 1 where they impinge and mix and react hypergolically in reaction chamber 9.

Conduit 14 of FIG. 4 receives a high pressure low volume delivery of alkaline metal reactant from a chemical metering pump (not shown). Depending on the manner of operation and product being produced the alkaline metals passing through conduit 14 are of two distinct types. In one instance the said alkaline metal charge is a 50/50 mixture, or different ratio of potassium and sodium, which at these ratios are present in the liquid state. These mixtures of alkaline reactant metals are used in the production of nitrates formed in the presence of charge air reaction from conduit 20 entering reaction chamber 9 of tuyere 1 through injector 11 orifices 21. The formed products are commercial fertilizers $KNO_3$ and $NaNO_3$ and sometimes $NH_4NO_3$ when excess hydrogen in the presence of HCl in the water reactant of conduit 17 is reacted with the nitrogen of the air charge from conduit 20. Other types of chemicals are produced in reaction chamber 9 of tuyere 1 in conjunction with subsequent continuing reactions occurring downstream in receiver vessel 24 shown in FIG. 10. These reactions require the use of heated $CO_2$ (2000°) charge gas or heated air through conduit 20 which is produced by the method described in cross-reference (5). The alkaline metal reactants used in this latter type of chemical production are metal dispersions in emulsions of heavy mineral and silicon based oils as described in cross-reference (1). The composition of the dispersion oil medium supplies both the carbon and hydrogen to be used in the synthesis of a variety of industrial organic chemicals in receiver vessel 24. When calcium (Ca) metal is present in the dispersion as a reaction rate moderator an intermediate bi-product of calcium carbide (CaC) is initially formed in the reaction chamber 9 of tuyere 1 and it subsequently undergoes a secondary hydrolysis reaction in the ionic capacitor 25 receiver vessel 24, shown in FIG. 10, producing acetylene gas which is collected in the upper level of the scrubber drum 28 also shown in FIG. 10. The acetylene ($C_2H_2$) produced is used as a syn-gas for commercial heating and also for continued chemical intermediate processing to synthesize other organic compounds and substances.

Figure 5:
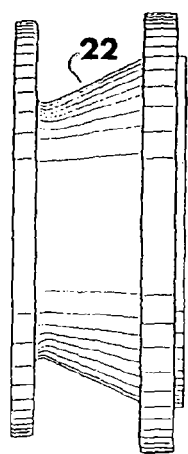
FIG. 5 is a side view of the tuyere conical transition piece for attachment to the scrubber inlet shown in FIG. 10.
Figure 6:
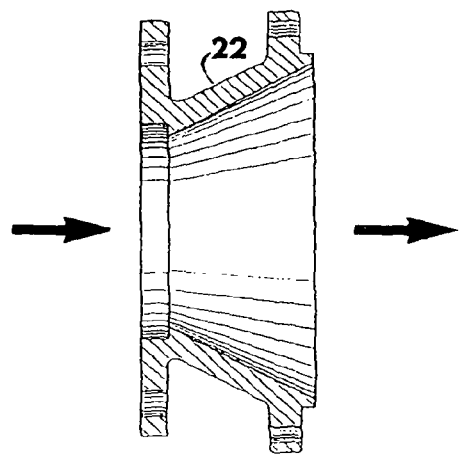
FIG. 6 is a side view of the tuyere transition piece showing the interior expanding conical flow surfaces within which is used to expand and accelerate the ion stream to super sonic velocities prior to impacting the cathode ionic capacitor collector plate surfaces positioned in front of the transition piece.

Turning now to FIG. 5. FIG. 5 is a side view of transition piece 22 which is used to connect tuyere 1 to inlet 23 of receiver vessel 24 positioned concentrically within scrubber drum 28 as shown in FIG. 10. The interior conical flow surfaces of transition piece 22 are shown in FIG. 6. The hot ionic product stream 12 from tuyere 1 reaction chamber 9 flowing through transition piece 22, shown in FIG. 8, is cooled by expansion in the conical transition piece 22 and the produced composition frozen in place. The remaining charged ions and electrons are accelerated by the expansion and enter the inlet 23 shown in FIG. 10, and pass into receiver vessel 24 where they impact the collector plates 26 of the cathode ionic capacitor 25 and are discharged. Electron flow from collector plates 26 of cathode ionic capacitor 25 is carried by ionic conduction in KOH electrolyte of conduit 29 to anode ionic capacitor (not shown). This electron flow is characteristic of all electrolytic flow between battery cathode and anode terminals except in this instance the electrons pass through intervening metal capacitor membranes as taught in cross-reference (2).

FIG. 6 shows the interior conical flow surfaces of transition piece 22.

Figure 7:
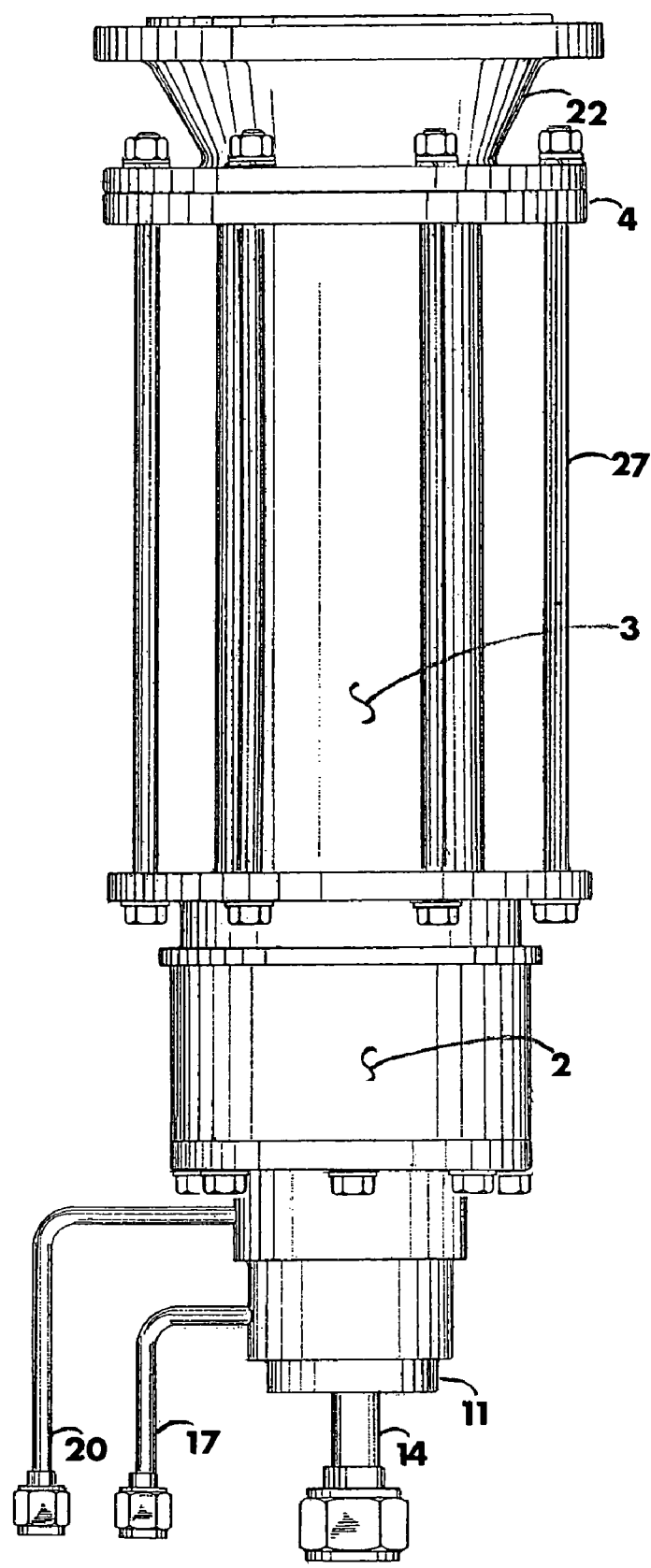
FIG. 7 is a side view of the tuyere assembly comprising the tuyere tubular body, the tuyere injector, tuyere rear and front flanges, and the tuyere transition piece and through bolts that hold the assembly together.

FIG. 7 is a side view of the intermediate assembly of the main structural elements comprising the "Potassium Electrical Generator and Chemical Synthesizer". The main structural components comprising the assembly are injector 11, tuyere 1, transition piece 22 and through bolts 27. Other features shown in FIG. 7 are detachable aft flange 4, dielectric capacitor, capacitor section 3, magnetic coil section 2, and injector 11 feed conduits 14, 17, and 20.

Referring to FIG. 8 which is a cross-section of the assembled injector 11, tuyere 1 and transition piece 22 previously presented in FIG. 7. Five torus shaped dielectric capacitors 13 are also shown in FIG. 8 assembled around dielectric capacitor section 3 above corresponding ceramic insulator rings 33 sections drawn in cross-hatch. Also shown in FIG. 8 are two electromagnetic coils 31 and 32 each positioned over magnet coil section 2. The said ring shaped ceramic insulators 33 drawn as cross-hatched sections, are placed over tuyere 1 capacitor section 3 to shield the dielectric capacitors 13 from the high thermal environment within capacitor housing 34 which is cooled by forced circulation of air entering through duct 40 and exiting at outlet duct 41. Capacitors 13 are in electrical communication with tuyere 1 by screws 42 and are connected in parallel through buss-bar 43 that carries the charge up through bus-bolt 44 to terminal 45. Ion stream 12 expanding in the conic transition piece 22 enters receiver vessel inlet 23 as shown in FIG. 10. Said inlet 23 enters receiver vessel 24 tangentially to promote a swirling action in said receiver vessel 24 and this swirling action is carried into scrubber drum 28.

Referring to FIG. 9. Ion stream 12 charges produced in the reaction chamber 9 are attracted to the inner surfaces of tuyere 1 and are transferred to the torus shaped dielectric capacitors 13. Sixteen strakes 7 are formed within reaction chamber 9 increase the capacity of the said charge attractive surface. The electric charges 46 attracted to the reaction chamber 9 and strake 7 surfaces reside only on the surfaces of the reaction chamber 9 and strakes 7. The densest charges 46 on the strakes occur where curvature of the surface is greatest, which is at the tip of strakes 7 as shown in FIG. 9. The tips of strakes 7 where the charge is greatest protrude into the inner volume of reaction chamber 9 where kinetic energy of the sonic flow is highest. The fast moving ionic stream 12 shears electrons from the tips of strakes 7 which is further accelerated by its expansion in transition piece 22 into the lower pressure environment in inlet 23 of receiver vessel 24 where it impacts collector plates 26 of the cathode ionic capacitor 25 shown in FIG. 10.

Referring now to FIG. 10 which is an assembly of the "Potassium Electric Generator and Chemical Synthesizer" constructed in part from elements described in the cross-references and is shown principally in cross-section. A squirrel cage air blower 47 is shown mounted on duct 40 of air housing 34 for convectively cooling the dielectric capacitor section 3 tuyere 1 and is expelled at duct 41. Electrons carried in ionic stream 12 which impact collector plates 26 of cathode ionic capacitor 25 electrically, by class 1 conduction pass through the center metal membrane structure of the cathode capacitor 25 and are carried by ionic conduction in KOH electrolyte solution flowing through conduit 29 to an ionic capacitor, not shown, as described in cross-reference (2). The outer load circuit of the generator is between the positive terminal 52 of the cathode ionic capacitor 25 and the negative terminal of the anode ionic capacitor, not shown. The condensed liquid formed in receiver vessel 24 is neutralized by high pressure scrubber water from conduit 30 that is sprayed into receiver vessel 24 through a plurality of ejectors 48. Said ejectors having facilities to add precipitative Gregnard types of reagents flowing through conduit 49. The neutralized liquid in receiver vessel 24 drains downward and exits scrubber drum 28 through bottom outlet 50 where it is further processed as a value added material as mentioned in cross-reference (4). Gaseous products remaining in scrubber drum 28 rise upward toward top outlet 37. These gases comprising air components, $CO_2$ and acetylene pass through condensing plates 35 cooled by cold water from conduit 36. Ultrasonic transducers 51 set at frequencies above 20 kc and corresponding harmonic nodes of magnetic waves from coil 52 of the same frequency aid $CO_2$ retention in the spray water where it is sequestered and reprocessed.

The unique features of the "Potassium Electric Generator and Chemical Synthesizer" to be claimed are only those elements presented in FIG. 8.

NUMBERED ELEMENTS

1. Tuyere
2. magnetic coil section
3. dielectric capacitor section
4. aft mounting flange
5. through-bolt 27 holes
6. forward flange
7. strakes (sixteen required)
8. bolt holes for mounting injector
9. reaction chamber
10. sectioning boundary for FIG. 8
11. injector 12. ion stream
13. dielectric capacitor
14. conduit (K,
15. manifold (K, Na)
16. orifice (K, Na)
17. conduit (water, $CaCl_2$) HCl
18. manifold (water, salt, $CaCl_2$, HCl)
19. orifice (water, NaCl, $CaCl_2$, HCl)
20. conduit ($CO_2$, air, $H_2$, $Cl_2$)
21. manifold ($CO_2$, air, $H_2$, $Cl_2$)
22. transition piece
23. inlet
24. receiver vessel
25. cathode ionic capacitor
26. collector plates
27. through bolls
28. scrubber drum
29. conduit (KOH)
30. conduit 30
31. electromagnet (tuyere I)
32 electromagnet (tuyere 1)
33. insulators
34. capacitor housing
35. condensing plates
36. conduit
37. drum outlet (upper)
38. orifice ($CO_2$, $H_2O$)
39.
40. inlet duct
41. outlet duct
42. screws
43. buss-bar
44. buss-bolt
45. terminal
46. strake-electron density
47. blower
48. ejectors
49. conduit
50. outlet (lower)
51. transducer
52. cathode positive terminal

What is claimed is:

1. A potassium electric generator and chemical synthesizer, comprising:

a ferrous metal tube, hereinafter called a tuyere, said tuyere comprising a reaction chamber within the length of its tubular interior, where the outer surface of said tuyere comprises a magnetic coil section at its forward end, a dielectric capacitor section at its aft end, a detachable aft flange at the exit end of said tuyere, and an intervening forward flange positioned between said magnetic coil section and said dielectric capacitor section, said forward flange having bolt holes for joining with said detachable aft flange having correspondingly aligned bolt holes, and where the interior surface of the tuyere comprises a plurality of equally spaced radial projections extending the full length of the tuyere reaction chamber, the projections hereinafter called strakes;

a plurality of ceramic insulator rings positioned upon said capacitor section;

a plurality of torus-shaped dielectric capacitor positioned around said ceramic thermal insulator rings, where said ceramic thermal insulator rings and said torus-shaped dielectric capacitors are restrained in place between said forward flange and detachable flange by through-bolts, and where said torus-shaped dielectric capacitors are electrically connected to a bus-bar to carry static charges resulting from chemical reactions occurring in the tuyere reaction chamber and on the tip protrusions to a terminal;

a transition piece at the aft end of the tuyere also secured by said through-bolts;

a capacitor housing positioned upon said dielectric capacitors, said capacitor housing having an inlet air duct and an outlet duct;

electromagnetic coils positioned upon and around said magnetic coil section; and an injector bolted to the forward inlet of the tuyere reaction chamber, where the injector comprises a plurality of reactant conduits for supplying reactants to corresponding reactant manifolds in said injector and channels leading from said reactant manifolds distributing said reactants to respective injector orifices for injection into said tuyere reaction chamber, and where a centrally positioned orifice of said injector is for the injection of alkaline metals into the center of said reaction chamber, a plurality of water orifices for the injection of water are equally spaced and positioned around said centrally positioned orifice, and a plurality of reactant orifices equally spaced and positioned around the outer perimeter of said water injection orifices.

2. The potassium electric generator and chemical synthesizer of claim 1 in which said injected alkaline metals are an alloy of potassium and sodium.

3. The potassium electric generator and chemical synthesizer of claim 1 in which said injected alkaline metals are dispersed in a heavy base oil.

4. The potassium electric generator and chemical synthesizer of claim 1 in which a salt is dissolved in the water injected into said reaction chamber through said water injection orifices.

5. The potassium electric generator and chemical synthesizer of claim 1 in which carbon dioxide is injected into said reaction chamber through said reactant orifices.

6. The potassium electric generator and chemical synthesizer of claim 1 in which air is injected into said reaction chamber through said reactant orifices.

7. The potassium electric generator and chemical synthesizer of claim 1 in which methane is injected into said reaction chamber through said reactant orifices.

8. The potassium electric generator and chemical synthesizer of claim 1 in which a hydrocarbon distillate is injected with carbon dioxide into said reaction chamber through said reactant orifices.

\* \* \* \* \*